No. 80,276.                                   PATENTED JULY 28, 1868.
J. DABLE.
MACHINE FOR UNLOADING RAILROAD CARS.
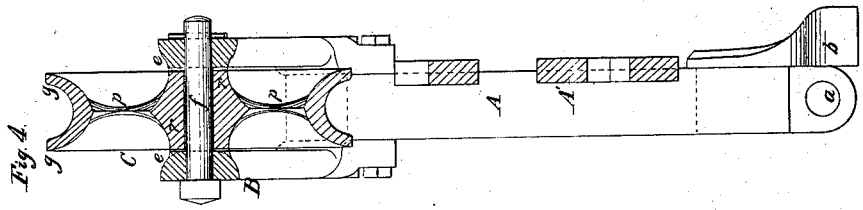
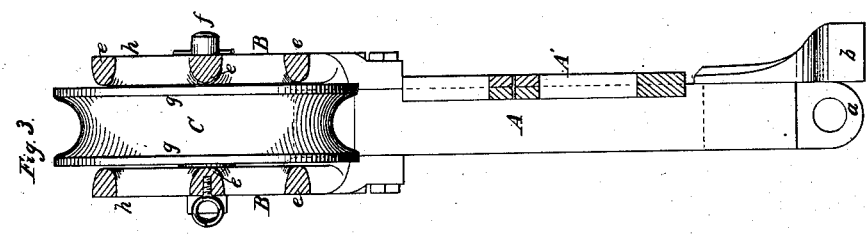
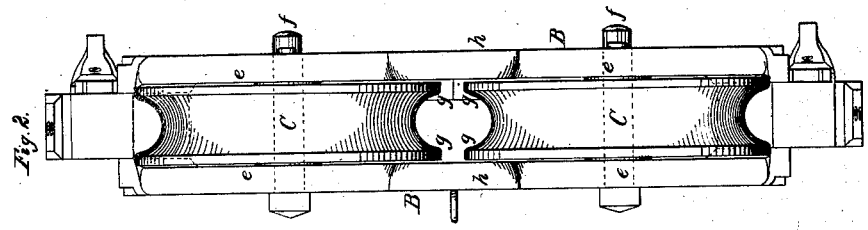
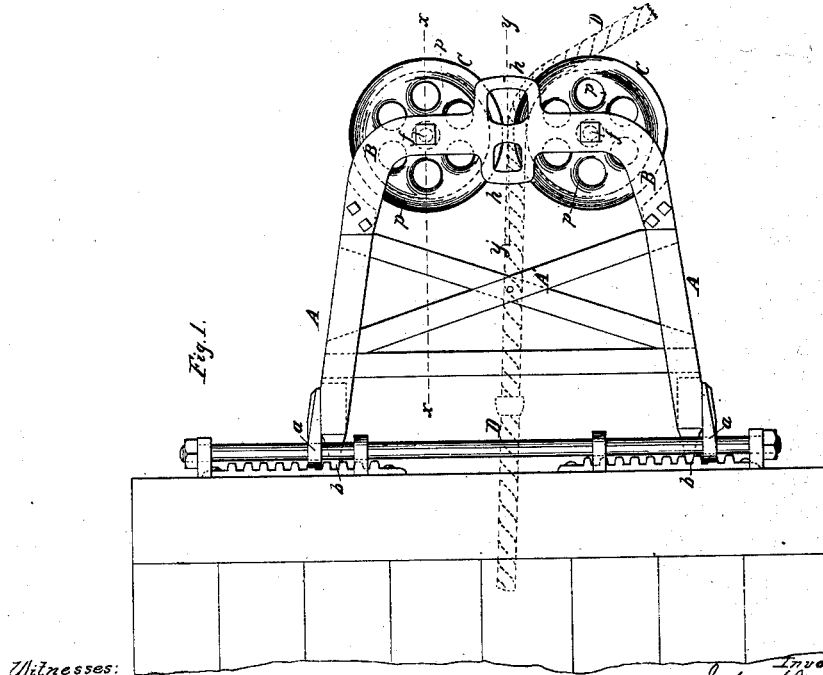
Witnesses:                                    Inventor:

United States Patent Office.

JOHN DABLE, OF CHICAGO, ILLINOI.

Letters Patent No. 80,276, dated July 28, 1868.

IMPROVEMENT IN MACHINE FOR UNLOADING RAILROAD-CARS

The Schedule referred to in these Letters Patent and making part of the same.

TO ALL WHOM IT MAY CONCERN:

Be it known that I, JOHN DABLE, of Chicago, in the county of Cook, and State of Illinois, have invented certain new and useful Improvements on Machines for Unloading Railroad-Cars; and I do hereby declare that the following is a full, clear, and exact description thereof, reference being had to the accompanying drawings, making a part of this specification, in which—

Figure 1 is a plane or top view of the swing-frame of a machine for unloading railroad-cars, having my improvements applied to it.

Figure 2 is an end view of the said frame enlarged.

Figure 3 is a section taken through the frame in the plane indicated by red line $y\,y$.

Figure 4 is a section taken through the frame in the plane indicated by red line $x\,x$.

Similar letters of reference indicate corresponding parts in the several figures.

This invention relates to new and useful improvements on the construction of certain parts belonging to swinging frames of machinery for unloading railroad-cars of grain and other substances, which improvements are designed to prevent the rope or ropes, to which the scoops or shovels are attached, from becoming entangled, and from slipping off the pulley or pulleys around which it is drawn in the operation of filling and discharging the scoops or shovels, or moving them to and from the door of a car; said improvements are also designed for preventing the pulleys from becoming clogged with grain.

The nature of my invention consists in the employment of open or perforated pulleys, having grooves in their peripheries, between head-plates, which are secured to the free end of a swinging frame, and which are constructed with those surfaces lying nearest the pulleys convex or rounded, so that grain will not find a lodgment upon or about the pulleys nor their supports, as will be hereinafter explained.

The invention further consists in constructing the bearing-plates or supports for grooved pulleys with devices or means which will effectually prevent a rope in the groove, in either one of the pulleys, from working out of its place or becoming entangled with any of the parts which support the pulleys upon their swinging frame, as will be hereinafter explained.

To enable others skilled in the art to understand my invention, I will describe its construction and operation.

The frame A, which I have shown in the drawings, may be constructed, supported, and operated in any manner common to machinery adapted for unloading railroad-cars. The frame which I have represented is constructed and adapted for the machine for unloading cars, which was secured to me by Letters Patent, No. 56,906, but I do not confine my improvements to a frame which is pivoted and arranged as described in said Letters Patent, although I prefer to adopt such arrangement.

Frame A consists of two converging beams, which are strongly braced by cross-bars A' A', and provided on their contracted extremities with two plates B B, which I shall term head-plates. The opposite ends of the said beams have hinging eyes $a\,a$ and tapering toothed projections $b\,b$ secured to them, the object of which is fully described in my aforesaid Letters Patent.

The two arched head-plates B B are constructed and secured to the swinging end of frame A, so as to form braces for the two convergent beams thereof, and also to serve as bearings and stays for two circumferentially-grooved pulleys C C, which may be made of any required diameter. These arched head-plates have their extremities bent or set, so that, when the plates are secured in their places on opposite sides of the frame A, so as to coincide with each other, as shown in the drawings, a space will be left between their inner surfaces of such width as to receive between them pulleys C C, which will receive in their grooves a rope or chain of the required size. The inner surfaces of the said plates C C are made convex or rounding, as shown at $e\,e$, in fig. 3, which surfaces will be presented to the sides of the pulleys.

When the pulleys are in their proper places, and sustained by pins $f\,f$ passing through their axes, and through the plates B B, the perimeters of their flanges $g\,g$ will nearly touch one another, so as to prevent the rope D from working out of place from the grooves in the pulleys.

To prevent said rope from working between the flanges $g$ $g$, between the two pulleys, and becoming wedged fast, I construct, upon the edges of the plates B B, projections $h$ $h$, which have their inner surfaces rounded, and which will serve as guards or fenders, and effectually, for preventing the rope or chain from working out of place at said points.

These projections may be perforated, as shown in the drawings, so that grain will not find lodgment upon them.

Each one of the pulleys C is constructed with a concave groove in its periphery, adapted for receiving a rope or chain, and its sides are also concave, with an open web, $p$, uniting its hub $r$ with its rim, which may be made as shown in the drawings, or in any other manner which will allow grain to pass freely through it. The ends of the hub $r$ are tapering or conical, and very much reduced, so that very little abutting surface will be presented to the convex surfaces of the head-plates, thereby preventing the pulleys from becoming wedged or impeded by the grain.

The size of the pulleys is not absolutely material, but those which I have constructed and prefer are about thirty-six inches in circumference, which size gives to them a sufficiently commanding purchase and power for all purposes, and particularly for relieving the same from all tendency to impediment by the grain.

The perforated and concave construction of the pulleys, as aforesaid, renders them light, and allows the grain, which, (when the machine is in operation,) is constantly being thrown by the shovels upon the head of the swing-frame, to pass freely through the perforations, and to fall upon the apron leading from the car to the hopper of the warehouse.

Having described my invention, what I claim as new, and desire to secure by Letters Patent, is—

1. A swing-frame of a car-unloading machine, provided with head-plates B B, having convex surfaces presented to the sides of pulleys C C, which are perforated and otherwise constructed, substantially as described.

2. Projections $h$, adapted to serve as guards or fenders for pulleys applied to the swinging frame of an unloading-machine, substantially as described.

3. Perforated guards $h$, perforated pulleys C C, and convex surface head-plates B B, applied to the swing-frame of an unloading-machine, substantially as described.

JOHN DABLE.

Witnesses:
C. M. HAWLEY,
DANIEL GOODWIN, Jr.